Jan. 5, 1954  J. J. SLOMER  2,665,081
CABLE REEL
Filed March 18, 1950  2 Sheets-Sheet 1

INVENTOR.
Joseph J. Slomer
BY Clarence F. Poole
ATTORNEY

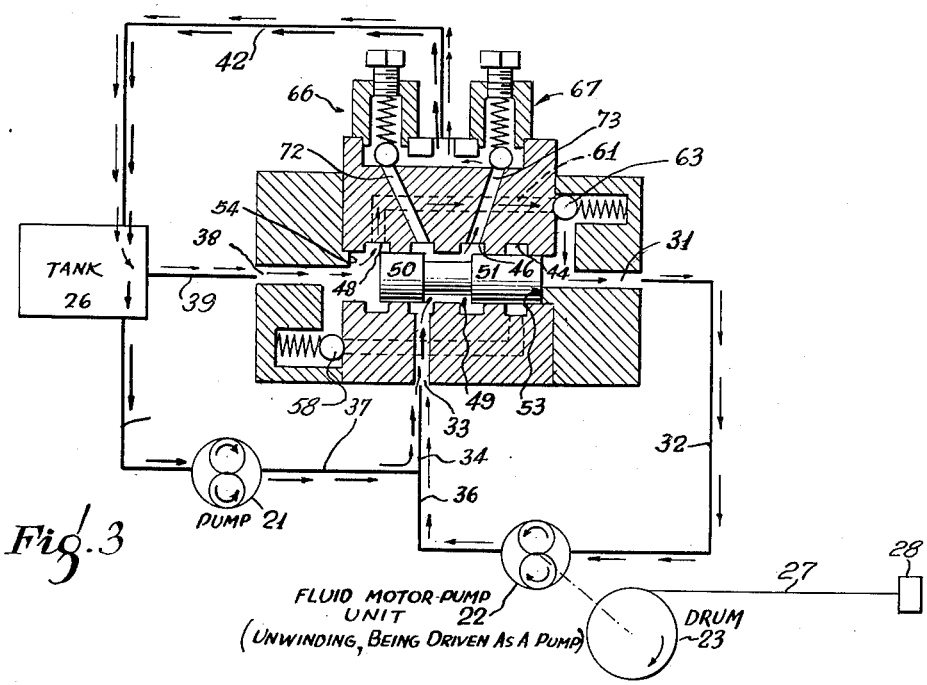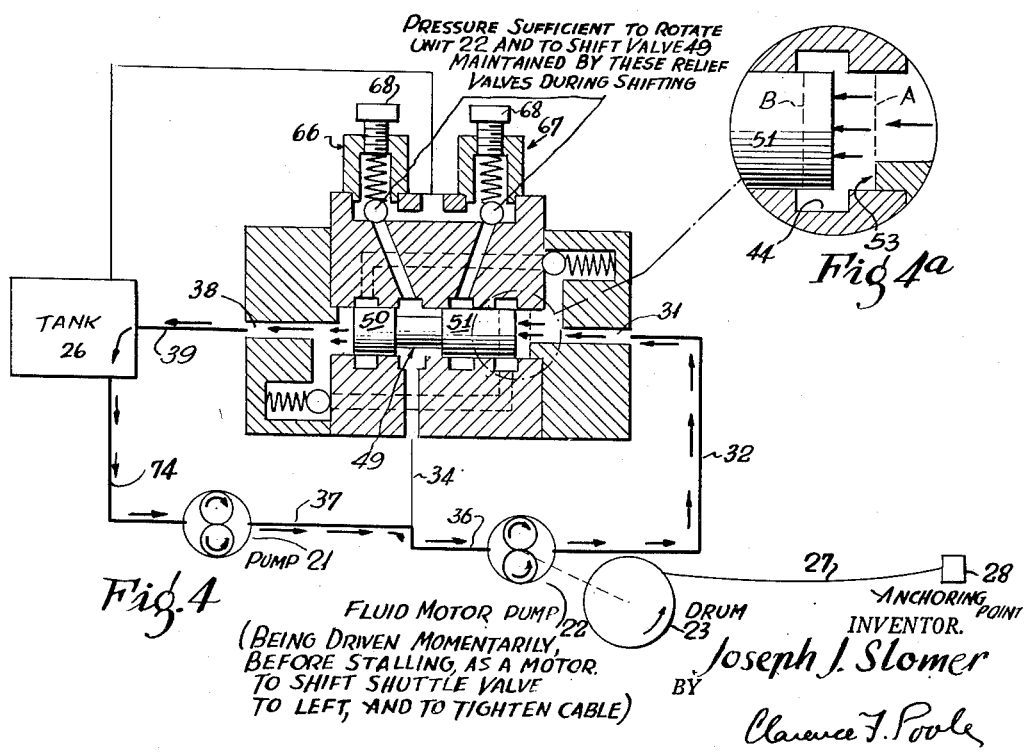

Patented Jan. 5, 1954

2,665,081

UNITED STATES PATENT OFFICE 2,665,081

CABLE REEL

Joseph J. Slomer, Chicago, Ill., assignor to Goodman Manufacturing Company, Chicago, Ill., a corporation of Illinois Application March 18, 1950, Serial No. 150,381

5 Claims. (Cl. 242—90)

This invention relates to improvements in cable reels particularly adapted for use on underground mine vehicles such as locomotives and shuttle cars and more particularly relates to a fluid motor drive for a cable reel adapted to supply power to such a vehicle from a fixed anchoring point or trolley wire.

Further, the present invention relates to an improved cable reel drive which maintains the cable taut when the vehicle is standing, drives the cable drum to wind in cable when the vehicle advances toward the cable anchoring point, and pays off the cable from the drum while exerting a predetermined tension thereon as the vehicle moves from the cable anchoring point, all automatically without any attention from the operator of the vehicle.

Specifically, this invention represents an improvement and simplification over the cable reel mechanism disclosed in Patent Re. 23,099, dated April 12, 1949.

An important object of this invention is to provide apparatus which will react instantly, to start winding the cable, when the vehicle suddenly reverses its direction after moving away from the anchoring point, in order to prevent the vehicle running over the cable and cutting or otherwise injuring it. In furtherance of this object, an important feature of the invention is the provision of a pressure relief valve and a movable control member therefor, in the outlet of the fluid motor when being driven as a pump, to maintain sufficient back pressure on the fluid motor to automatically condition the fluid motor for subsequent winding movement as soon as the vehicle stops at the end of an unwinding movement.

Another object is the provision of a hydraulically operated cable reel mechanism having simplified individual adjustments for the cable tension during winding and unwinding.

Other objects and advantages will be apparent from the following description taken in connection with the accompanying drawing in which:

Fig. 3 is similar to Fig. 1 but shows the course of fluid flow when the fluid motor and pump unit is being driven as a pump by the cable drum during unwinding, as when the vehicle is moving away from the anchoring point;

Figure 1:
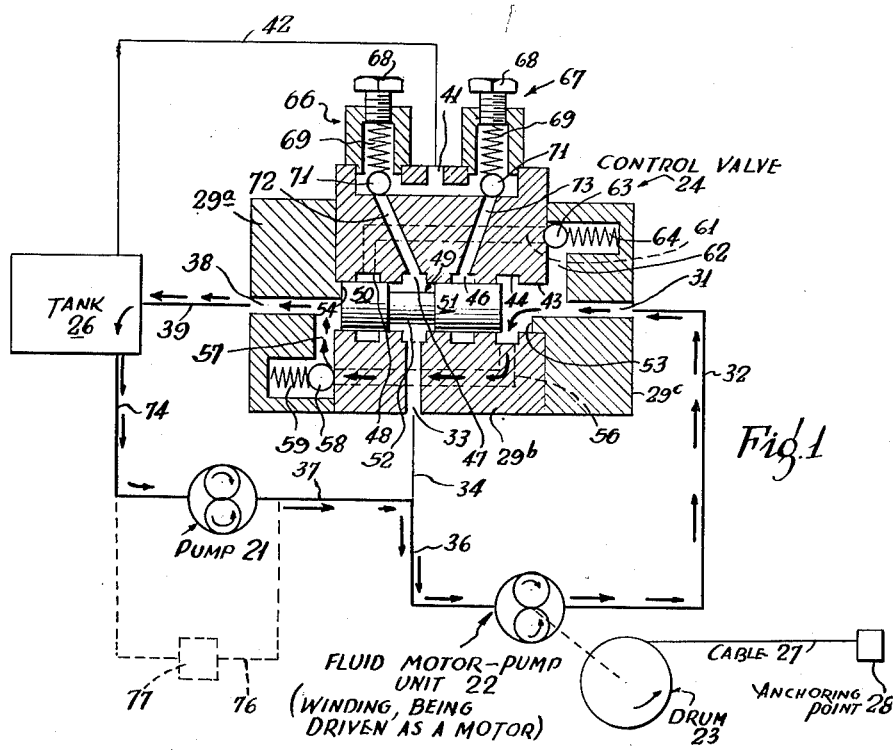
Figure 1 is a diagramatic view illustrating one embodiment of the improved circuit for driving a combined fluid motor and pump operatively connected with a cable reel; the course of fluid flow and arrangement of parts being shown in winding position such as would be the case when the vehicle is moving toward the cable anchoring point.

Fig. 4 is similar to Fig. 1 but shows the course of fluid flow, during the momentary interval at the end of unwinding movement, when the fluid motor and pump unit is being driven as a motor to take up slack in the cable and to shift the control valve means into position to call for subsequent, instant winding operation, as when the vehicle stops after moving away from the cable anchoring point; and Fig. 4a is a fragmentary enlarged view of Fig. 4.

Referring now more particularly to the drawings, it will be understood that the pump 21, the combined fluid motor and pump unit 22, the cable drum 23, the control valve 24, and tank or reservoir 26 will be carried by an electrically operated vehicle such as a mine locomotive or shuttle car (not shown), the latter obtaining its electric power through a cable 27 plugged into an anchoring point indicated at 28 (or from a trolley line, as will be pointed out subsequently).

Suitable motor means (not shown) will be provided for driving the pump 21 and if desired, it may be of the constant rotating type, always rotating in the same direction whether the vehicle is moving forward or backward, or is stopped. The control valve 24 comprises, in this instance, a casing made up of three parts: 29a, 29b and 29c. The casing is formed with: an inlet-outlet port 31 connecting through line 32 with one side of the motor-pump unit 22; an inlet port 33 communicating through conduits 34 and 36 with the other side of the motor-pump unit 22, and communicating through conduits 34 and 37 with the outlet side of pump 21; an inlet-outlet port 38 communicating through conduit 39 with tank or reservoir 26; and an outlet port 41 communicating through conduit 42 with tank. The interior of the valve casing is formed with a bore 43 extending through section 29b. The bore is circumferentially grooved at intervals as indicated at 44, 46, 47 and 48. Reciprocably movable within the bore is a shuttle valve control element or blocking valve element generally designated 49 having opposite head ends 50 and 51 with a reduced diameter portion 52 therebetween. The control element 49 functions to selectively block off the grooves 44, 46, 47 and 48, responsive to the direction of flow through the motor-pump unit 22, as will be described. Stops 53 and 54 formed within the casing limit movement of the control valve in both directions. Groove 44 communicates through passageways 56 and 57 with port 38, flow being restricted in one direction by means of check valve 58 urged closed by spring 59. Similarly, groove 48 communicates through passageways 61 and 62 with port 31, flow being restricted in one direction by means of check valve 63 urged closed by spring 64.

The blocking element or valve control element 49 shuttles freely between Fig. 1 and Fig. 3 positions, responsive to pressure differentials existing across its ends. In the Fig. 1 position groove 44 is open to permit flow from 31 to 38, and groove 48 is closed; the Fig. 3 position, groove 48 is open to permit flow from 38 to 31, and groove 44 is closed—this arrangement, together with the cooperating check valves 58 and 63 providing for full shifting movement of the control element 49 from right to left when unit 22 is driven as a motor, and from left to right when the unit is driven as a pump. This may be seen, as the description proceeds, by an inspection of Figs. 1 and 3.

Atop the casing 29b is a pair of pressure relief valves 66 and 67. Each has a screw adjusting element 68 bearing against a spring 69 which in turn maintains a ball 71 against a seat to normally close the upper ends of passageways 72 and 73 communicating with grooves 47 and 46 respectively. The relief valves 66 and 67 join in a common outlet passage leading into port 41.

While the elements comprising the control valve have herein been shown diagrammatically as they might be incorporated into a single casing, it nevertheless should be understood that certain of the components may be set apart separately if desired and interconnected by suitable conduit means.

Normally when the vehicle is advancing toward the anchoring point 28, the motor-pump unit 22 will be driven as a fluid motor to rotate drum 23 for winding cable 27. Fluid will then flow as indicated by the arrows in Figure 1, taking the path from pump 21, through motor-pump unit 22, into the inlet-outlet port 31 through passageway 56, check valve 58 and passageway 57, out port 38, to tank and back to the pump through conduit 74. Under these conditions the shuttle valve element 49 will be held over against stop 54 by the pressure differential existing between ports 31 and 38. In this case it will be noted that the outlet from the pump 21 will be in direct communication with relief valve 66 through conduit 34, port 33, groove 47 and passageway 72. The relief valve 66 may be set by adjustment of its screw 68 to relieve, to tank, any excess or dangerous pressure which otherwise might be applied to the motor-pump unit 22 as will be described in the following paragraph.

Figure 2:
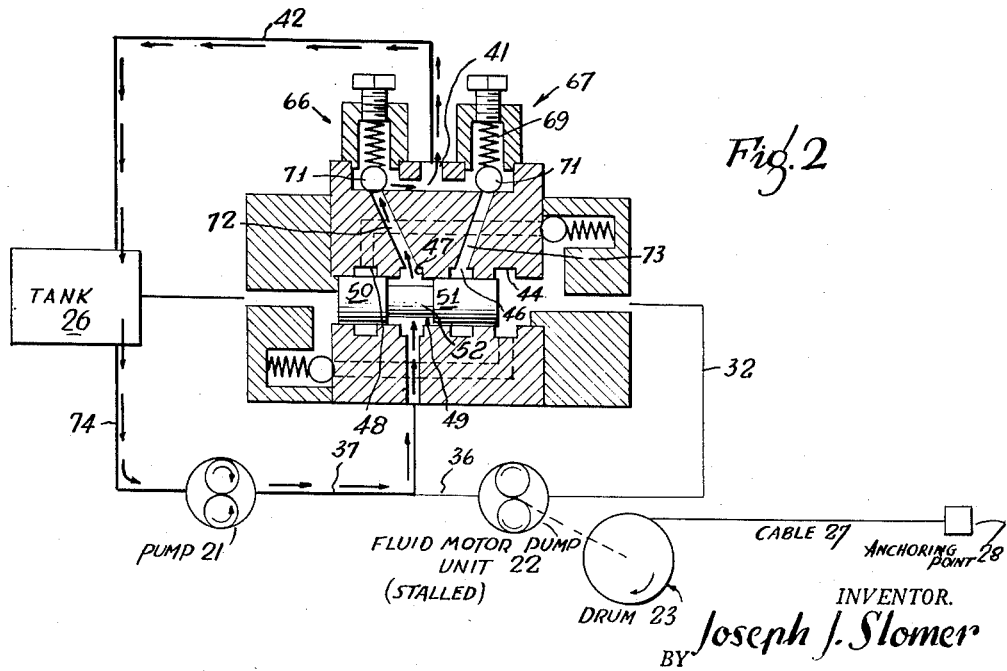
Fig. 2 is similar to Fig. 1 but shows the course of fluid flow when the fluid motor and pump unit is stalled, as when the vehicle is stopped and the cable is taut at the end of winding or unwinding movements.

Referring now to Fig. 2, the condition is shown where the motor-pump unit 22 is stalled, as would be the case when the vehicle is standing either at the end of winding or unwinding movement of the drum. In this case the pumped fluid discharged into conduit means 37—36 will be unable to pass through the stalled unit and it will be bypassed through relief valve 66 to tank. Thus, in this case, the relief valve, and its adjustment, provides a limit to the pressure that can be applied to the motor-pump unit 22 and also provides for automatically recycling the pumped fluid to tank whenever the unit 22 is stalled, thereby making it possible to run the pump 21 continuously without any attention on the part of the operator.

Under some circumstances, relief valve 66, together with its corresponding passageway 72, may be dispensed with, as for example where the pump 21 incorporates its own maximum pressure controlling means, or where the maximum pressure developed by the pump 21 is insufficient to cause any undesirable effects when applied directly to the unit 22, even when the latter is stalled. By way of specific example, Fig. 1 illustrates, in broken lines, a recycle conduit 76 and pressure relieving means 77 which, in some instances, may be substituted for valve 66 and passageway 72.

As shown in Fig. 3, when the vehicle moves away from the anchoring point 28, the cable will be unwound from the drum thereby rotating unit 22 backwards so that it will operate as a pump. At the instant that such backward rotation begins, the suction in line 32 will draw the shuttle valve 49 to the right against stop 53 thereby causing valve end 50 to uncover groove 43 and permit the fluid passing through the motor-pump unit 22 to be drawn from tank through port 38, passageway 61, and port 31 and be recycled, together with the output from pump 21, through port 33 and passageway 73 through relief valve 67 and out to tank through conduit 42. The reason that flow at this time is directed through relief valve 67 instead of 66 is that the former is set to relieve at a lower pressure in order to bring the back pressure (in conduit 36, etc.) on unit 22 down to a reasonable value for, in turn, bringing down tension applied to the cable to a reasonable value during unwinding. Illustrating this point by means of a specific set of figures, where the valve 66 is set to relieve at 300 pounds per square inch the tension on the cable may be approximately 40 pounds while the vehicle is advancing and winding cable onto the drum. If the same pressure were to be permitted on the outlet side of the unit 22 when it is operating as a pump during unwinding, the cable pull might rise to 120-150 pounds, or even more, which would be sufficient to break, or at least severely strain, the cable. Therefore, to bring the cable tension during unwinding down to a reasonable value, say, not more than 80 pounds, the relief valve 67 is provided and would be set to relieve at about 100 pounds per square inch.

A metering orifice has sometimes been used in the past in place of the relief valve 67 but this has been found to be unsatisfactory in many instances for three reasons: first, it is impossible to maintain any particular cable tension because the back pressure varies widely with viscosity of fluid and rate of flow; second, it is impossible to adjustably vary the back pressure; and third, the back pressure cannot always be maintained high enough, at reasonable flow rates, to shift the shuttle valve 49 quickly enough, when the vehicle movement reverses suddenly and starts advancing toward the anchoring point, to prevent the vehicle overrunning and damaging the cable before winding begins.

By reference to Fig. 4 it will be seen how, when the vehicle stops, following unwinding movement of the drum, the valve member 49 will be shifted instantly to condition the system for winding movement of the drum in event the vehicle subsequently moves toward the anchoring point. Assume, for example, that the vehicle is moving away from the anchoring point and flow through the various parts of the circuit is occurring as shown in Fig. 3. Assume further, now, that the vehicle stops. Shifting of the valve 49 from the right stop 53 to the left stop 54 will then occur during the next momentary interval by pressure from pump 21 being diverted (by reason of back pressure created by valve 67) through the motor-pump unit 22 into port 31. This momentary pumping movement of unit 22 will proceed until it is stalled by tension developed in the cable, but at any rate will proceed until the shuttle valve has been completely shifted to the left; that is, the right end of the shuttle valve will be shifted from A to B, as shown in Fig. 4a. Then, the instant the vehicle begins moving toward the anchoring point, it will be in condition to recycle fluid for winding operation as shown in Fig. 1, and at higher pressure.

Thus, it will be seen that an important feature of the invention resides in the provision of the relief valve 67 and shuttle valve 49 arranged in series between the reservoir 26 and the common output conduit 34 for the pump 21 and unit 22 (when the latter is driven as a pump). By this arrangement, in which the control element 49 is moved to its Fig. 3 position to provide communication between the above-mentioned common output conduit and the relief valve 67, responsive to flow of fluid when the unit 22 is driven as a pump, the back pressure on the unit 22 during unwinding is limited to a desired maximum value for maintaining the tension on the cable at a desired value as predetermined by the setting of relief valve 67.

It will be apparent that the system disclosed herein may be employed advantageously in other cable-reeling applications, for example, for reeling and unreeling cable carried by a trolley pole running along a trolley line of varying height. In such case, the trolley line could be regarded as an equivalent of the above-mentioned anchor point 28.

While a preferred embodiment of the present invention has been shown and described it will be apparent that many specific structural modifications may be made without departing from the scope of the invention. Accordingly the scope of the invention should be limited only by the following claims.

I claim:

1. In a cable reel mechanism for a vehicle adapted to be supplied with electric power from a fixed point and adapted to move towards and away from said fixed point, characterized by a winding drum mounted on said vehicle for movement therewith, a cable on said drum connected to said fixed point for providing a power connection from said fixed point to said vehicle and adapted to be wound upon or payed off of said drum when said vehicle moves toward or away from said fixed point, a fluid reservoir, a pump connected thereto for supplying fluid under pressure; a fluid motor-pump unit connected to the pump and drivably connected to said drum and driven in one direction by pressure fluid from said pump as a fluid motor for driving said drum to wind cable thereon, and driven in the opposite direction as a pump responsive to movement of said drum in a direction to pay off cable therefrom; control valve means for controlling the pressure of said pressure fluid; the improvement comprising a second control valve connected between said motor-pump unit and said reservoir, said second control valve being set to relieve at a lower pressure than the first-mentioned control valve means, and a blocking valve connected between said motor-pump unit and said reservoir and operable, when the latter acts as a motor and pump, respectively, to block and unblock the passage of fluid from said motor-pump unit to reservoir through said second control valve.

2. In a cable reel mechanism for a vehicle adapted to be supplied with electric power from a fixed point and adapted to move towards and away from said fixed point, characterized by a winding drum mounted on said vehicle for movement therewith, a cable on said drum connected to said fixed point for providing a power connection from said fixed point to said vehicle and adapted to be wound upon or payed off of said drum when said vehicle moves toward or away from said fixed point, a fluid reservoir, a pump connected thereto for supplying fluid under pressure; a fluid motor-pump unit connected to the pump and drivably connected to said drum and driven by pressure fluid from said pump as a fluid motor for driving said drum to wind cable thereon, and driven as a pump responsive to movement of said vehicle away from said fixed point while paying cable from said drum; a valve for controlling the pressure of said pressure fluid; the improvement comprising a second valve having a shuttle element associated therewith which is connected to said unit and shiftable in response to flow of fluid through said motor pump unit when the latter is operating as a pump to divert, to said reservoir, the combined fluid output of the motor-pump unit and the pump through said second valve to reduce the output pressure to a predetermined maximum amount to maintain a predetermined maximum tension on said cable when being payed off of said winding drum.

3. In a cable reel mechanism for a vehicle adapted to be supplied with electric power from a fixed point and adapted to move towards and away from said fixed point, characterized by a winding drum mounted on said vehicle for movement therewith, a cable on said drum connected to said fixed point for providing a power connection from said fixed point to said vehicle and adapted to be wound upon or payed off of said drum when said vehicle moves toward or away from said fixed point, a fluid reservoir, a pump connected thereto for supplying fluid under pressure; fluid motor-pump unit connected to said pump by conduit means, said unit being drivably connected to said drum to drive the latter to wind cable thereon when being driven as a fluid motor by fluid supplied under pressure through said conduit means from said pump when the vehicle is moving toward said fixed point, means for supplying said unit with fluid from said reservoir at times, said unit being driven as a pump to discharge fluid from said reservoir into said conduit means responsive to movement of said drum in a direction to pay off cable; a relief valve between said reservoir and said conduit means effective to limit pressure in the latter to a predetermined maximum value; the improvement comprising a second relief valve between said reservoir and conduit means set to relieve pressure from the latter at a predetermined lesser maximum pressure; a blocking valve between said second relief valve and said conduit means, said blocking valve being movable toward and away from a position to provide communication between the second relief valve and the conduit means; and means responsive to operation of said unit as a pump when cable is being payed off of the drum to move said blocking valve to its said position to permit relief of pressure in the conduit means through the second relief valve to maintain a tension on the paying out cable as predetermined by the maximum pressure setting of the second relief valve.

4. In apparatus of the class described, a hydraulic system including a reservoir and a pump for supplying pressure fluid, fluid operated mechanism drivable in one direction by said pressure fluid as a motor and drivable in another direction as a pump: the combination therewith of valve control means for limiting the back pressure on said fluid operated mechanism when acting as a pump, and for limiting the working pressure of said pressure fluid from said first named pump comprising a valve body having a shiftable valve member therein, said valve member having a first shifted position when said fluid operated mechanism acts as a motor, and a second shifted position when said fluid operated mechanism acts as a pump, and relief valve means including a first relief valve connected in series with said valve member in said first shifted position thereof to operate at a predetermined value, and a second relief valve connected in series with said valve member in said second shifted position thereof to operate at a different predetermined value.

5. In apparatus of the class described, a hydraulic system including a reservoir and a pump for supplying pressure fluid, fluid operated mechanism drivable in one direction by said pressure fluid as a motor and drivable in another direction as a pump: the combination therewith of valve control means for limiting the back pressure on said fluid operated mechanism when acting as a pump, and for limiting the working pressure of said pressure fluid from said first named pump comprising a valve body having a shiftable valve member therein, said shiftable valve member having a first shifted position when said fluid operated mechanism acts as a motor, and a second shifted position when said fluid operated mechanism acts as a pump, a port in said valve body and a passage in said valve body including first relief valve means connected in said passage and operable at a predetermined value, a second passage in said valve body including second relief valve means operable at a different predetermined value, said valve member in said first shifted position connecting the output of said first named pump with said port and said first named passage to said first relief valve means, and said valve member in said second shifted position connecting the output of said first named pump and said fluid operated mechanism when acting as a pump with said port and said second named passage to said second relief valve means.

JOSEPH J. SLOMER.

References Cited in the file of this patent
UNITED STATES PATENTS

| Number | Name | Date |
|---|---|---|
| 2,395,302 | Slomer | Feb. 19, 1946 |
| 2,467,238 | Slomer | Apr. 12, 1949 |